No. 830,032. PATENTED SEPT. 4, 1906.
J. P. WRIGHT.
MACHINE FOR FOLDING BOX TRAYS.
APPLICATION FILED FEB. 6, 1902. RENEWED JAN. 21, 1905.

4 SHEETS—SHEET 1.

Witnesses:
Jas. E. Hutchinson.
Henry C. Hazard.

Inventor.
Jacob P. Wright,
by Edwin J. Prindle,
his Attorney.

No. 830,032. PATENTED SEPT. 4, 1906.
J. P. WRIGHT.
MACHINE FOR FOLDING BOX TRAYS.
APPLICATION FILED FEB. 6, 1902. RENEWED JAN. 21, 1905.
4 SHEETS—SHEET 2.
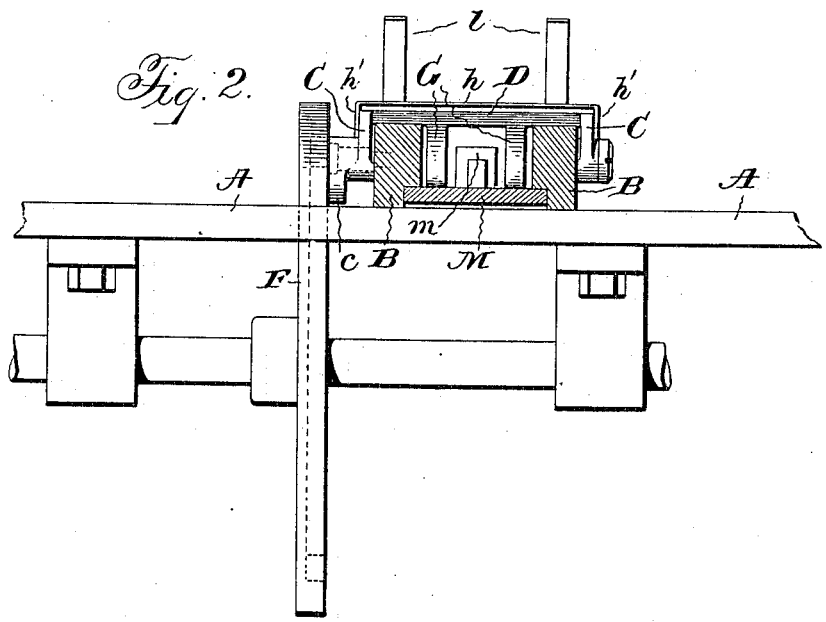
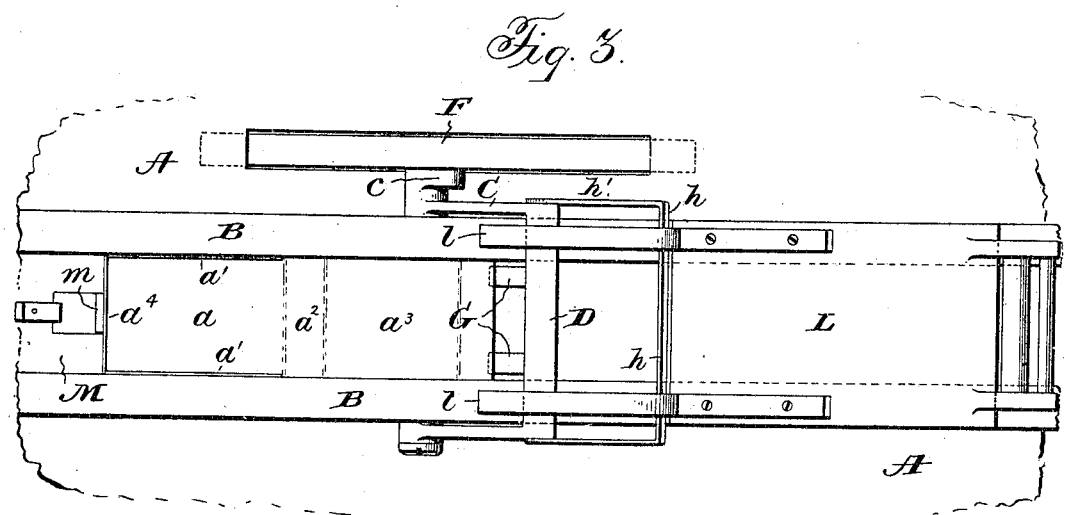
Witnesses:
Jas. E. Hutchinson.
Henry C. Hazard.
Inventor.
Jacob P. Wright,
by Edwin J. Prindle
his Attorney.

No. 830,032. PATENTED SEPT. 4, 1906.
J. P. WRIGHT.
MACHINE FOR FOLDING BOX TRAYS.
APPLICATION FILED FEB. 6, 1902. RENEWED JAN. 21, 1905.
4 SHEETS—SHEET 3.
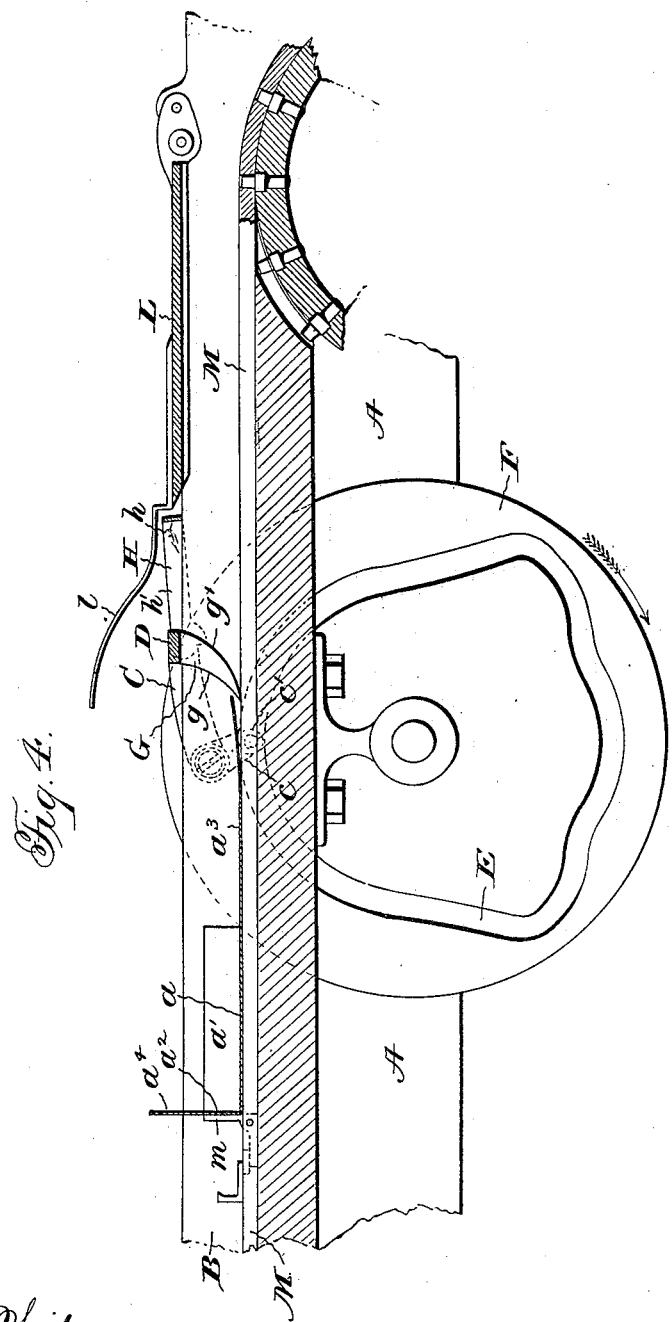

No. 830,032. PATENTED SEPT. 4, 1906.
J. P. WRIGHT.
MACHINE FOR FOLDING BOX TRAYS.
APPLICATION FILED FEB. 6, 1902. RENEWED JAN. 21, 1905.

4 SHEETS—SHEET 4.

Witnesses:
Jas. E. Hutchinson
Henry C. Hazard

Inventor.
Jacob P. Wright,
by Edwin J. Prindle,
his Attorney.

THE NORRIS PETERS CO., WASHINGTON, D. C.

UNITED STATES PATENT OFFICE.

JACOB P. WRIGHT, OF AKRON, OHIO, ASSIGNOR TO THE DIAMOND MATCH COMPANY, OF NEW YORK, N. Y., A CORPORATION OF ILLINOIS.

MACHINE FOR FOLDING BOX-TRAYS.

No. 830,032.     Specification of Letters Patent.     Patented Sept. 4, 1906.

Application filed February 6, 1902. Renewed January 21, 1905. Serial No. 242,145.

*To all whom it may concern:*

Be it known that I, JACOB P. WRIGHT, of Akron, in the county of Summit, and in the State of Ohio, have invented certain new and useful Improvements in Machines for Folding Box-Trays; and I do hereby declare that the following is a full, clear, and exact description thereof, reference being had to the accompanying drawings, in which—

Figure 1:
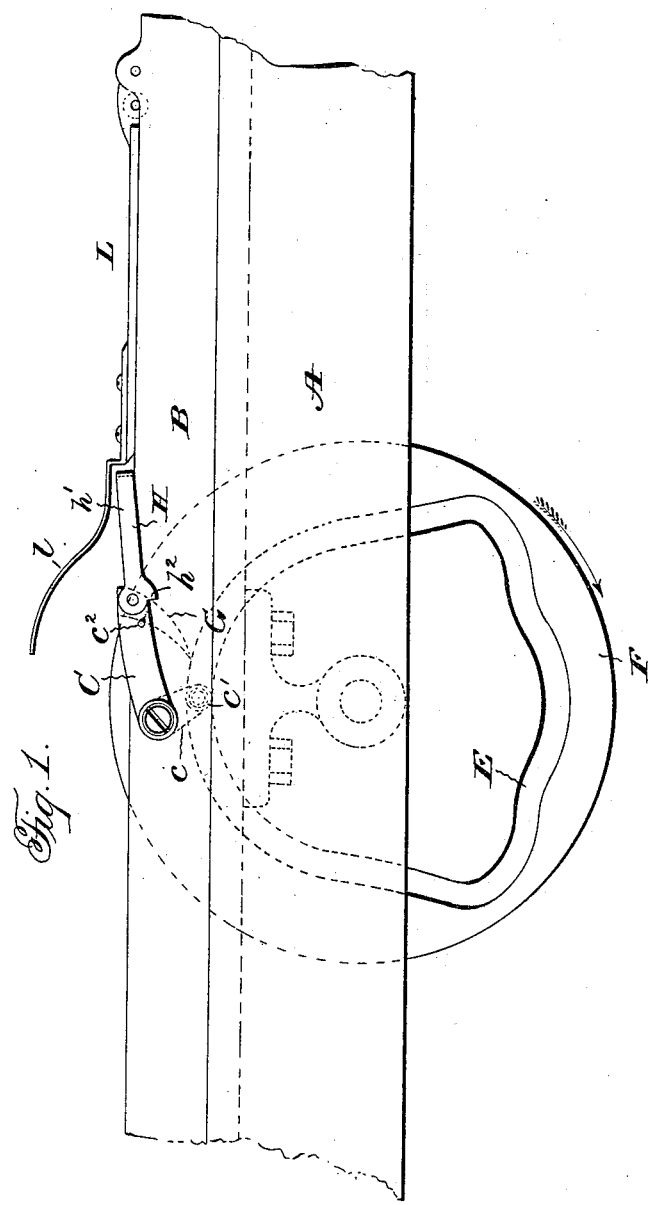
Figure 5:
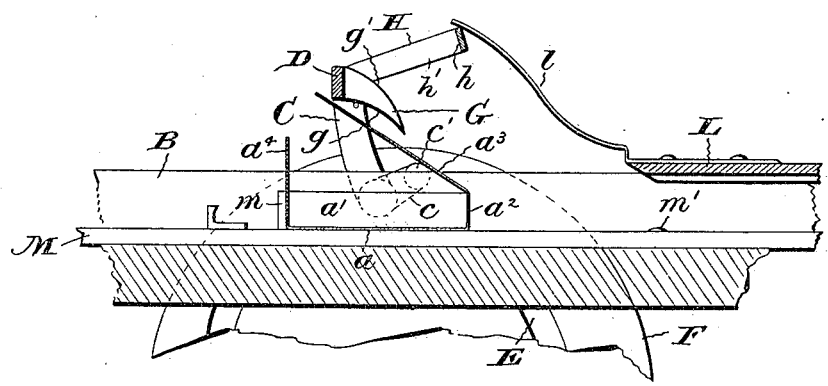
Figure 6:
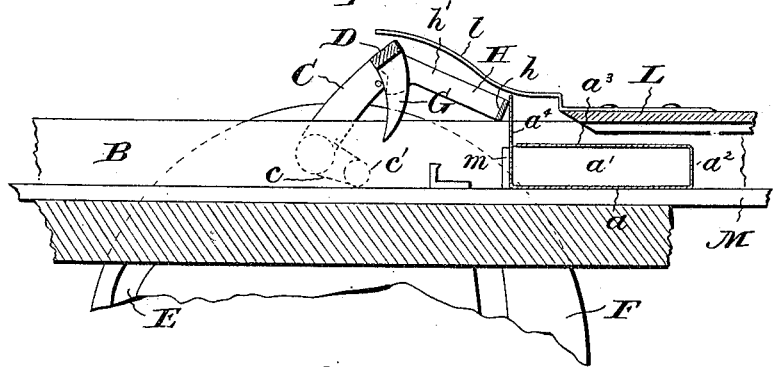

Figure 1 is a side elevation of a portion of a machine embodying my invention. Fig. 2 is a transverse sectional view of the same. Fig. 3 is a plan view thereof. Fig. 4 is a longitudinal sectional view thereof. Figs. 5 and 6 are views corresponding to Fig. 4, showing the parts in different positions; and Fig. 7 is a plan view of a blank adapted to be operated upon by the illustrated machine.

Letters of like name and kind refer to like parts in each of the figures.

The object of my invention has been to provide a machine for folding box-trays, which machine shall be capable of rapidly and accurately folding such trays, so that they can readily be inserted into their shucks; and to such ends my invention consists in the machine for folding box-trays hereinafter specified.

Figure 7:
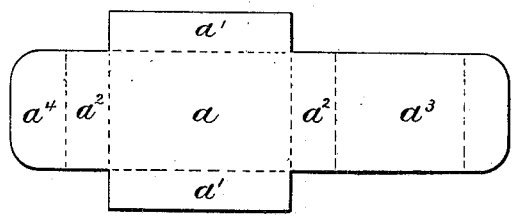

The machine which I have chosen to illustrate my invention is especially adapted for folding a tray such as is illustrated in Fig. 7, which tray consists of a bottom $a$, having side flaps $a'$ and ends $a^2$ formed on or attached thereto, one of such ends having a flap $a^3$ formed upon its free edge and the other of such ends having a short flap $a^4$ formed upon its free edge. The side flaps and ends are folded perpendicularly to the bottom. The long flap is then folded parallel to the bottom and the short flap folded upon the long flap, as illustrated in Figs. 5 and 6.

In carrying my invention into practice I provide a base A, upon which are secured parallel guide-rails B, that are separated by a distance substantially equal to the width of a folded tray. Upon the outer faces of the said rails are pivoted arms C, that are connected by a cross-bar D, the said arms and cross-bar forming a yoke. The pivots are conveniently formed by screws threaded into the sides of the rails. Upon one of the arms C a crank-arm $c$ is formed, and such arm upon its free end carries an antifriction-roller $c'$, which roller engages a path-cam E, formed in the side of a cam-body F, which cam-body is mounted upon a shaft having bearing in brackets on the under face of the bed. The cam is uniformly driven in the direction indicated by the arrow in Fig. 4 by any convenient means. Upon the cross-bar D is secured or fastened a tooth or teeth G. The said tooth is provided with a concave front face $g$, that in a downward direction approaches the pivot of the yoke, and with a convex rear face $g'$, whose lower edge meets the lower edge of the face $g$, and which surface recedes from the surface $g$ in an upward direction. A link H, having a cross-bar $h$ and two side bars $h'$, is pivoted to the ends of the arms C by means of its side bars $h'$. A shoulder $h^2$ is formed upon each of the arms, and each of such shoulders is adapted to engage a pin $c^2$, that projects from the side of an arm C, so that when the yoke is raised above a given point it shall carry with it the link. At the rear of the link a cover L is mounted upon the rails, and such cover is provided with upwardly and forwardly curved arms $l$, that are adapted to guide the link and to prevent its being thrown over forward when the yoke is quickly raised. A carrier-belt M is mounted to travel on the face of the bed and between the rails, and such belt is provided with holders $m$, that engage the trays and cause them to move with the belt. Each of such holders consists of two plate-like arms that are perpendicular to each other, and each folder is mounted in an opening in the belt by a pin passing through the belt and the point of union of said arms.

In the operation of my machine as above illustrated the tray-blank is placed upon the carrier-belt between the rails, with its side flaps $a'$ folded into vertical position with the folder, so that its upper arm is vertical, and with the front end $a^2$ of the tray resting against the rear face of the folder. The long flap extends rearward, raised slightly above the belt by a button $m'$ on the upper face of the belt, and the short flap $a^4$ extends vertically. In this condition the carrier carries the tray toward the yoke and link. The yoke is depressed by its cam, so that the point of its tooth rests upon or stands close to the surface of the belt. The long flap rides up upon the surface $g$ of the tooth and is thus turned to a vertical position. The tooth is then raised above the level of the side flaps $a'$, and as the tray continues its rearward travel the long flap passes under the tooth and is folded down upon the body of the tray. The tooth then descends to assist such folding operation. The rearward end of the long flap then passes beneath the cross-bar $h$ of the link, which latter keeps the flap under control and prevents its turning over rearward, and before the said flap has escaped from the control of the link it begins to pass beneath the forward edge of the cover L, which is beveled to facilitate such passage, and the said cover folds the said flap downward, if necessary, and holds it down, so that the short flap can be folded over the same. The tooth having acted upon the long flap is raised high enough so that the short flap can pass beneath both the tooth and the link, and when such flap has passed to the rear of the cross-bar $h$ of the link the yoke is depressed, lowering the link upon the tops of the rails and causing the cross-bar to travel rapidly to the rear, and such action brings the cross-bar against the front face of the short flap and causes it to be folded down upon the long flap and to be held there until the short flap has passed beneath the cover, which latter prevents either flap from rising.

The above-illustrated embodiment of my invention is capable of many changes which are within the scope of my invention.

Having thus described my invention, what I claim is—

1. In a machine for folding box-trays, the combination of a carrier for box-trays, a pivoted arm having a tooth that is inclined toward the pivot of said arm, a link pivoted to said arm and having a cross-bar substantially parallel to said pivot, and means for moving said arm and link, whereby said tooth is first caused to engage and fold a flap formed on the rear end of a tray-blank carried by said carrier, and said cross-bar is then caused to engage and fold a flap formed on the front end of said tray-blank, substantially as described.

2. In a machine for folding box-trays, the combination of a carrier for box-trays, a pivoted arm having a tooth that is inclined toward the pivot of said arm, a link pivoted to said arm and having a cross-bar substantially parallel to said pivot, means for moving said arm and link, whereby said tooth is first caused to engage a flap formed on the rear end of a tray-blank carried by said carrier to raise said flap from a horizontal position and to fold it over upon the tray-blank, whereby said tooth and said cross-bar are then raised above a flap formed on the front end of such tray-blank, and whereby said cross-bar is then lowered and moved rearward to fold said last-mentioned flap, substantially as and for the purpose described.

3. In a machine for folding box-trays, the combination of a pair of guide-rails, a carrier for tray-blanks, movable between said guide-rails, a pivoted arm movable in a plane perpendicular to said carrier, a tooth carried by said arm, a second arm pivoted to the free end of said first-mentioned arm, a cross-bar carried by said second arm and extending transversely to said carrier, and a cover on said rails at the rear of the rearmost position of said cross-bar, and means for moving said arms, whereby said tooth is caused to engage and fold over a flap formed on the rear end of a blank carried by said carrier, whereby said cross-bar is then caused to engage said flap until said flap has passed beneath said cover, and whereby said cross-bar is then raised over a flap formed on the front end of said tray-blank, and is caused to engage the front face of said flap to fold said flap on said first-mentioned flap, and to hold it until it has passed beneath said cover, substantially as and for the purpose described.

In testimony that I claim the foregoing I have hereunto set my hand this 16th day of January, A. D. 1902.

JACOB P. WRIGHT.

Witnesses:
B. C. Ross,
O. A. Tickner.